(12) United States Patent
King et al.

(10) Patent No.: US 10,669,954 B2
(45) Date of Patent: Jun. 2, 2020

(54) NATURAL GAS SUPPLY SYSTEM FOR PROVIDING CONDITIONED NATURAL GAS TO DUAL FUEL ENGINES

(71) Applicant: SUPREME ELECTRICAL SERVICES, INC., Houston, TX (US)

(72) Inventors: Toby King, Yukon, OK (US); Cory W. Glass, Houston, TX (US); James Ritter, Rosenberg, TX (US)

(73) Assignee: SUPREME ELECTRICAL SERVICES, INC., Houston, TX (US)

( * ) Notice: Subject to any disclaimer, the term of this patent is extended or adjusted under 35 U.S.C. 154(b) by 248 days.

(21) Appl. No.: 15/552,246

(22) PCT Filed: Oct. 28, 2015

(86) PCT No.: PCT/US2015/057875
§ 371 (c)(1),
(2) Date: Aug. 18, 2017

(87) PCT Pub. No.: WO2016/133563
PCT Pub. Date: Aug. 25, 2016

(65) Prior Publication Data
US 2018/0073467 A1    Mar. 15, 2018

Related U.S. Application Data

(60) Provisional application No. 62/118,984, filed on Feb. 20, 2015, provisional application No. 62/191,635, filed on Jul. 13, 2015.

(51) Int. Cl.
| | | |
|---|---|---|
| F02D 19/06 | (2006.01) |
| F02D 19/10 | (2006.01) |
| F02D 25/00 | (2006.01) |
| F02D 41/00 | (2006.01) |
| F02D 19/02 | (2006.01) |
| F02M 21/02 | (2006.01) |
| F02D 19/08 | (2006.01) |
| F02M 21/06 | (2006.01) |
| F02D 29/06 | (2006.01) |
| F02D 41/30 | (2006.01) |

(52) U.S. Cl.
CPC ......... *F02D 19/061* (2013.01); *F02D 19/023* (2013.01); *F02D 19/029* (2013.01); *F02D 19/0626* (2013.01); *F02D 19/0634* (2013.01); *F02D 19/0647* (2013.01); *F02D 19/081* (2013.01); *F02D 19/105* (2013.01); *F02D 25/00* (2013.01); *F02D 41/0025* (2013.01); *F02D 41/0027* (2013.01); *F02M 21/0212* (2013.01); *F02M 21/0215* (2013.01); *F02M 21/0227* (2013.01); *F02M 21/0245* (2013.01); *F02M 21/0263* (2013.01); *F02M 21/0284* (2013.01); *F02M 21/06* (2013.01); *F02D 19/0668* (2013.01); *F02D 29/06* (2013.01); *F02D 41/3094* (2013.01); *F02D 2200/0611* (2013.01); *Y02T 10/32* (2013.01); *Y02T 10/36* (2013.01)

(58) Field of Classification Search
CPC ....... F02D 19/063; F02D 19/029; F02D 25/00
See application file for complete search history.

(56) References Cited

U.S. PATENT DOCUMENTS

2008/0011248 A1*  1/2008  Cutlip ................. E21F 7/00
                                                   123/3
2014/0311469 A1* 10/2014  Hughes ............ F02D 19/0647
                                                   123/575

* cited by examiner

*Primary Examiner* — Kevin A Lathers
(74) *Attorney, Agent, or Firm* — Leela Madan (57) ABSTRACT

Embodiments of the present invention include a method and apparatus for supplying conditioned natural gas to dual fuel engines.

27 Claims, 8 Drawing Sheets

NATURAL GAS SUPPLY SYSTEM FOR PROVIDING CONDITIONED NATURAL GAS TO DUAL FUEL ENGINES

CROSS-REFERENCE TO RELATED APPLICATION

The present application, pursuant to 35 U.S.C. 111(b), claims the benefit of the earlier filing date of provisional application Ser. No. 62/118,984 filed Feb. 20, 2015, and entitled "Natural Gas Supply System for Providing Conditioned Natural Gas to Dual Fuel Engines" and provisional application Ser. No. 62/191,635 filed Jul. 13, 2015, and entitled "Providing Conditioned Natural Gas to Dual Fuel Engines."

BACKGROUND OF THE INVENTION

Field of the Invention

The present invention relates to a method and apparatus for regulating and conditioning the supply of gaseous fuels to engines using dual fuels. In particular, the present invention relates to a method and apparatus for supplying conditioned natural gas to dual fuel diesel engines.

Description of the Related Art

Trucks, boats, locomotives, as well as generators and other equipment operated in the field, are generally fueled by gasoline or diesel fuel. The air pollution problems associated with the reliance on fossil fuels for fueling these engines are well known and have led to various regulations that are aimed at reducing the amount of pollutants discharged into the atmosphere.

In recent years, expanded petroleum exploration and development has led to an increased supply of natural gas. Increasing supplies of natural gas, together with the impending tightening of emissions regulations are key factors in the drive to use natural gas as a fuel of choice for the automobiles, trucks, boats, locomotives and diesel equipment used at field sites. Natural gas has the capability of producing less air emitted pollutants, producing less carbon dioxide ($CO_2$), particulate matter, oxides of sulfur (SOx) and oxides of nitrogen (NOx) from combustion. Furthermore, natural gas is less expensive than diesel.

The use of dual fuel diesel technology, where diesel engines are adapted to utilize natural gas in co-combustion with diesel fuel, provides flexibility in power delivery while reducing the amount of diesel fuel used. These types of systems are referred to as dual fuel or bi-fuel engines. Natural gas fuel can be substituted for diesel fuel in varying proportions according to an engine's operating conditions. In addition, natural gas is available from multiple sources as Liquefied Natural Gas (LNG), Compressed Natural Gas (CNG), Pipeline Gas (PG), or as field gas, so that the use of natural gas at a field site greatly reduces cost, transportation and emissions.

A need exists for an improved means of optimizing the delivery and substitution of natural gas for diesel fuel in field equipment.

SUMMARY OF THE INVENTION

The present invention relates to a method and apparatus for regulating and conditioning the supply of natural gas to dual fuel engines.

According to an embodiment, a natural gas supply system is provided. The natural gas supply system includes: (A) a natural gas processing unit having: (i) a natural gas conditioning system; (ii) a first gas characterization component in operative communication with the natural gas conditioning system; and (iii) an electronic control system in operative communication with the natural gas conditioning system, the first gas characterization component, and a plurality of dual fuel engines; (B) one or more dual fuel engines, wherein each dual fuel engine has an engine sensor mechanism in communication with that dual fuel engine and the electronic control system of the processing unit; and (C) an enrichment unit, the enrichment unit comprising: (i) an enrichment control unit in communication with the engine sensor mechanism of the connected dual fuel engine; (ii) an enrichment injector coupled to the enrichment control unit; and (iii) a source of liquefied petroleum gas. The natural gas supply system further includes a source of natural gas. The liquefied petroleum gas is propane, butane, isobutane, pentane or a mixture of the same.

The natural gas supply system further including an emergency shutdown valve in close proximity to an outlet of the natural gas processing unit.

The first gas characterization component is located downstream of the natural gas conditioning system. The first gas characterization component is configured to determine one or more characteristic parameters of the conditioned natural gas. The first gas characterization composition is configured to communicate changes to a value associated with the one or more characteristic parameters of the conditioned natural gas to the natural gas conditioning system. The natural gas supply system further includes an optional second gas characterization component, wherein the second gas characterization component is located upstream of the natural gas conditioning system. The second gas characterization component is configured to determine one or more characteristic parameters of a pre-conditioned source natural gas.

The natural gas supply system also includes a first field distribution system, wherein the first field distribution system comprises: (i) a gas supply line having a proximal end and a distal end, wherein the proximal end is attached to the natural gas processing unit; (ii) a manifold supply line, wherein a first end of the manifold supply line is connected to the distal end of the gas supply line; and (iii) a discharge manifold having a header with an inlet end, wherein the inlet end is connected to a second end of the manifold supply line, and wherein the header has a plurality of manifold header outlets transverse to a longitudinal axis of the header. In one embodiment, the discharge manifold comprises five equally spaced manifold header outlets. At least one or more of the manifold header outlets is connected to a corresponding engine supply line.

The natural gas supply system also includes a purge line, wherein the purge line is coupled to the gas supply line. The gas supply line has substantially a same diameter as the manifold supply line.

The natural gas supply system further includes a reel of hose, wherein one end of the hose is connected to the gas supply line and a second end of the hose is connected to the manifold header. The internal diameter of the hose and the internal diameter of the manifold header are substantially larger than the internal diameter of the manifold header outlets and the internal diameter of the engine supply lines.

According to an embodiment, the natural gas supply system includes a second field distribution system, wherein the second field distribution system is attached to an outlet end of the discharge manifold. According to yet another embodiment, the natural gas supply system includes a third and a fourth field distribution system, wherein the third and the fourth field distribution systems are positioned parallel to first and second field distribution systems respectively. Each of the first, second, third, fourth, etc. field distribution systems may include substantially similar components and systems.

The electronic control system is configured to determine a desired BTU/cf for each dual fuel engine, as well as a minimum desired BTU/cf for all of the dual fuel engines. The electronic control system is further configured to instruct the natural gas conditioning system to process a source gas to a BTU/cf that is about 10-50 BTU/cf below the minimum desired BTU/cf for all of the dual fuel engines before delivering the processed gas to the dual fuel engines.

In one embodiment, the enrichment unit is configured to be inserted in the manifold supply line. In another embodiment, the enrichment unit is configured to be inserted in the engine supply line. The enrichment unit further comprises an electronic flow control device. In one aspect, the flow control device comprises a flow meter. The enrichment injector may include an atomizer or a needle injector.

According to another embodiment, a process for providing conditioned natural gas comprises: providing a natural gas system described earlier; dynamically determining one or more characteristic parameters of a source natural gas; treating the source natural gas by removing condensates and recovering petroleum gas liquids; and enriching the treated natural gas by injecting it with a calculated amount of the liquid petroleum gas. The process further involves determining an optimal fuel burn requirement for the source natural gas by comparing test data for the dual fuel engines with real time operating data for the dual fuel engines. The process further involves analyzing one or more characteristic parameters of the treated natural gas, and wherein the LPG is injected upon the condition that a value associated with the one or more characteristic parameters of the treated natural gas is less than a predetermined threshold value. The enriched natural gas can be provided to the dual fuel engines at an optimum flow rate and pressure.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Embodiments of the present invention include methods and systems for providing conditioned natural gas to dual fuel engines. The dual fuel engines may be used at a field site to run equipment such as generators to produce electrical power during natural disasters, and to provide electrical power for refugee and medical outposts, construction and mining equipment.

Figure 1:
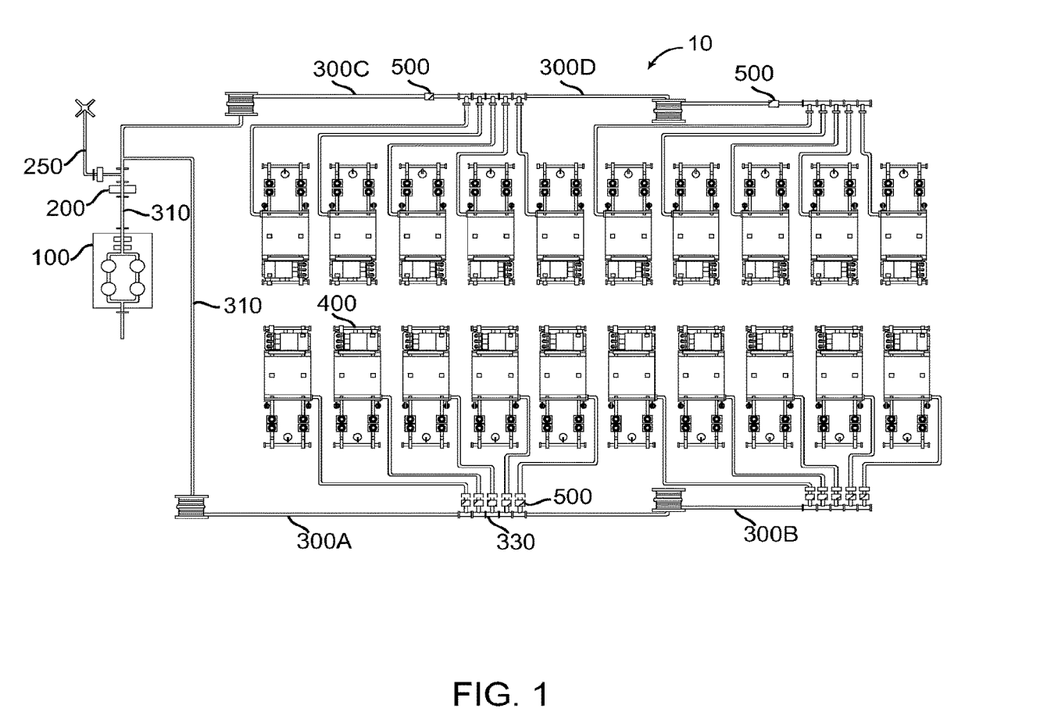
FIG. 1 is a schematic of a natural gas fuel supply system according to one embodiment of the invention.

One embodiment of a natural gas supply system 10, as illustrated in FIG. 1, is a modular system including a natural gas processing unit 100 that determines the composition of the source gas and conditions the source gas, if needed, an emergency shutdown valve 200, a purge line 250, a field distribution system 300 for delivering the conditioned source gas to dual fuel equipment, such as, dual fuel engines 400, and a gas enrichment unit 500 for enriching the conditioned source gas, as needed, before delivering it to the on-site dual fuel engines 400.

The Natural Gas Processing Unit

The characteristics of the natural gas coming into the natural gas supply system 10 vary with the source of the natural gas. For example, raw gas must be purified to meet the quality standards specified by the major pipeline and transmission companies or to meet the specifications for the production of commercial LNG or CNG. Thus, the use of PG, LNG, or CNG as the source of natural gas in the natural gas supply system 10 will require significantly less purification than using local source field gas or wellhead gas.

Field gas or wellhead gas is a highly desirable alternative as its use reduces costs and environmental impact. One of the advantages of the natural gas supply system 10 is that it can condition field gas to fuel quality gas used to run dual fuel engines. Field gas composition and quality can vary greatly from one location to another but basically all of it must be conditioned to fuel gas quality. Typically, this conditioning will involve removing condensate, water, acid gas, and mercury from the field gas and then recovering petroleum gas liquids (PGLs). The PGLs include ethane, propane, butane, isobutane, pentane and even higher molecular weight hydrocarbons. The separated PGLs are typically stored for sale or fractionation into sellable hydrocarbon components.

Figure 2A:
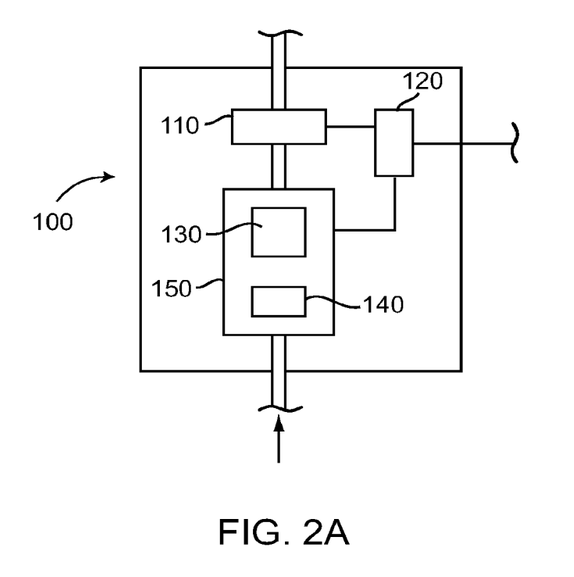
FIG. 2A is a schematic of a natural gas fuel processing unit according to one embodiment of the invention.
Figure 2B:
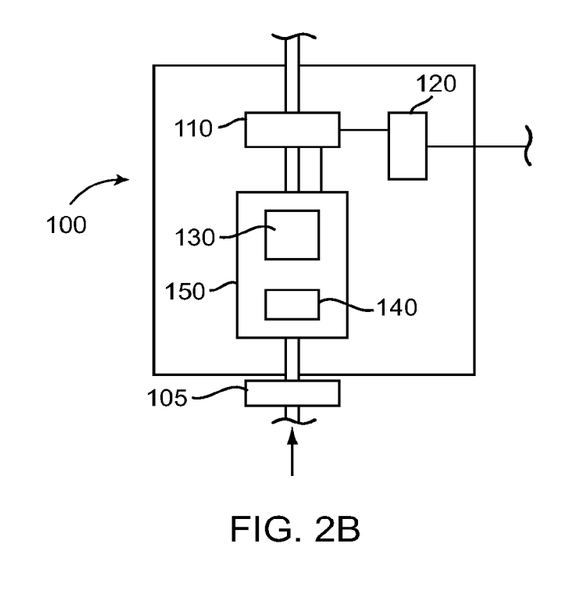
FIG. 2B is a schematic of a natural gas fuel processing unit according to another embodiment of the invention.

Whenever field gas is being used, as illustrated in FIGS. 2A and 2B, the natural gas processing unit 100 can be specifically configured with a natural gas conditioning or processing system 150 to condition the field gas to fuel gas quality natural gas for on-site use. The natural gas processing unit 100 configured to utilize and condition field gas may include a condensate separator 140 such as, a knock out tank and/or filters to remove condensates, water, precipitates and toxic materials, as well as a PGL separator 130 such as, a Joule-Thompson unit.

The natural gas processing unit includes a first gas characterization component 110. The first gas characterization unit may measure the heating value of conditioned gas in British Thermal Unit/cubic foot (or "BTU/cf"). The first gas characterization component 110 may also determine other characterization parameters of the conditioned natural gas such as its composition, the moisture content, the temperature, pressure and flow rate of the gas.

As shown in FIG. 2B, the natural gas processing unit 100 may also optionally include a second gas characterization component 105. The second gas characterization component 105 may include a gas chromatograph. Although, typically, the composition of the source gas may be provided by the field operator, the second gas characterization component 105 can be configured to constantly monitor the composition of the source gas. The second gas characterization component 105 may also measure the characterizations parameters of the source gas such as its BTU/cf, the moisture content, the temperature, pressure and flow rate of the gas.

Referring now to FIGS. 2A and 2B, the natural gas processing unit 100 can also include an electronic control system 120 that is in constant communication with the first gas characterization component 110 and the natural gas conditioning system 150. The electronic control system 120 typically includes one or more processing units (CPUs), one or more network interfaces, memory, and one or more communication buses for interconnecting these components. Memory includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory optionally includes one or more storage devices remotely located from the CPU(s). Memory, or alternately the non-volatile memory device(s) within memory, includes a non-transitory computer readable storage medium. In some implementations, memory or the computer readable storage medium of memory stores the following programs, modules and data structures, or a subset thereof: an operating system that includes procedures for handling various basic system services and for performing hardware dependent tasks; a network communication module that is used for connecting the central processing engine to other computers via the one or more communication network interfaces (wired or wireless) and one or more communication networks, such as the Internet, other Wide Area Networks, Local Area Networks, Personal Area Networks, metropolitan area networks, VPNs, local peer-to-peer and/or ad-hoc connections, and so on.

The first gas characterization component 110 may constantly monitor the parameters of the conditioned gas being produced for downstream delivery and may be configured to communicate any desired changes to the natural gas conditioning system 150 such as shown in FIG. 2B. Alternatively, the electronic control system 120 may be configured to provide operating instructions for each of the components of the natural gas conditioning system 150 (as shown in FIG. 2A) in order that the natural gas conditioning system 150 can produce a conditioned natural gas having the desired parameters, such as, BTU/cf for the downstream components of the natural gas supply system 10, such as the gas enrichment unit 500 and the dual fuel engines 400 (as shown in FIG. 1).

The Field Distribution System

As shown in FIG. 1, the conditioned gas from the natural gas processing unit 100 can be distributed to the dual fuel engines 400 through a modular field distribution system 300. The field distribution system 300 can include a first field distribution system 300A. A second field distribution system 300B can be added to the outlet side of the discharge manifold 330. Third and fourth field distribution systems 300e and 300D may be added in parallel to the first and second field distribution systems 300A and 300B. Preferably the natural gas supply system 10 includes one to six field distribution systems having no more than 30 dual fuel engines 400 running on one natural gas supply system 10.

The conditioned natural gas from the natural gas processing unit 100 can pass through a supply line 310. An emergency shutdown mechanism, such as, valve 200, may be located in close proximity to the outlet of the natural gas processing unit 100. The valve 200 can be used to shut down the discharge of gas in emergencies. The natural gas supply system 10 also includes a purge line 250 tied into the supply line 310. The purge line 250 generally terminates at a flare for flaring gas that must be purged from the natural gas supply system 10. One object of the natural gas supply system 10 is to minimize the amount of gas that is flared on-site.

Figure 3A:
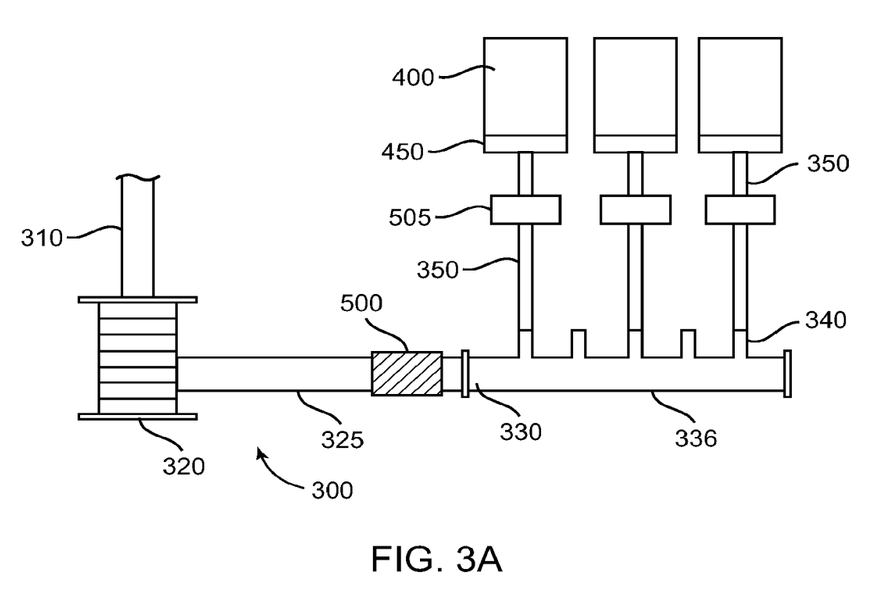
FIG. 3A is a schematic of a field distribution system according to one embodiment of the invention.
Figure 3B:
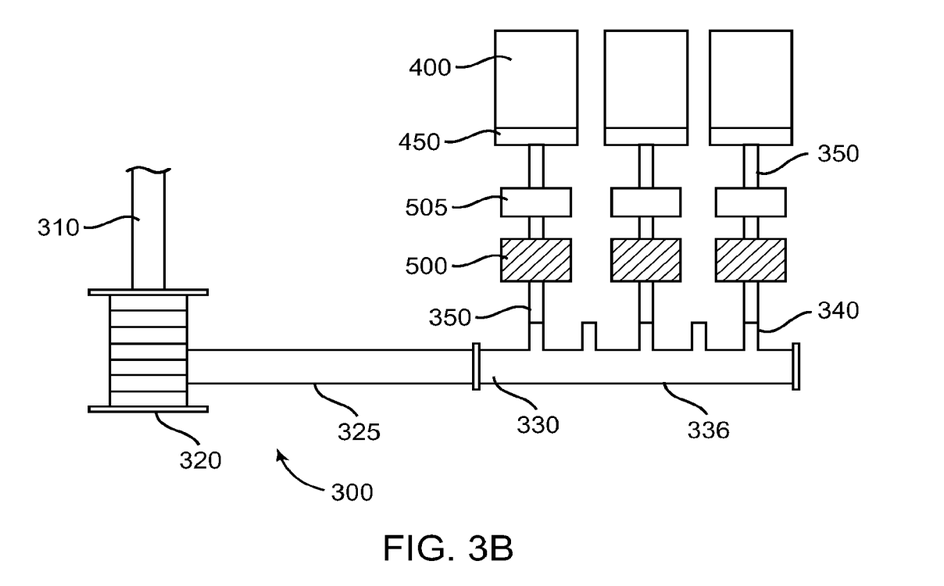
FIG. 3B is a schematic of a field distribution system according to another embodiment of the invention.

A couple embodiments of field distribution system 300 are illustrated in FIGS. 3A and 3B. The supply line 310 may be of at least the same diameter as a hose or manifold supply line 325. The hose 325 may be constructed of steel, PVC or other suitable material for gas distribution.

Each field distribution system 300 can include a discharge manifold 330 with a plurality of manifold outlets 340 transverse to a longitudinal axis of the discharge manifold 330. The manifold outlets 340 may be equally spaced along the length of manifold header 336. An engine supply line 350 selectably connects the manifold outlets 340 to the fuel inlets of each of the dual fuel engine 400. Thus, the conditioned gas that enters the inlet of the manifold header 336 can be selectably supplied to one or more dual fuel engines 400 through the manifold outlets 340.

The field distribution system 300 includes a reel 320 of flexible hose 325 connected at one end to the supply line 310 and at an opposed end to the inlet of a discharge manifold 330 with a plurality of manifold outlets 340, preferably 3-5 outlets. In order to maintain a sufficient supply of natural gas to all of the on-site dual fuel engines 400, the internal diameters of the hose 325 and the manifold header 336 are significantly larger, preferably from about 150% to 300% larger, than the internal diameters of the manifold outlets 340 and engine supply lines 350. An exemplary field distribution system 300 uses a 4 inch supply line 310, a 4 inch flexible braided steel hose 325, and a discharge manifold 330 with a 12 foot long 4 inch header 336 with five lateral 2 inch manifold outlets 340 oriented at 90° to the longitudinal manifold 330 axis. A quick coupling device, such as a TODO™ coupling, can selectably sealingly connect each manifold outlet 340 to an engine supply line 350.

The Dual Fuel Engine Sensor and Communication System

It is highly desirable to optimize the natural gas substitution rate for each dual fuel engine 400. Natural gas/diesel dual fuel engines 400 need at least a minimal diesel component for proper combustion. An optimum fuel ratio that maximizes the substitution rate of natural gas is about 70% natural gas to 30% diesel. Operators strive to optimize the rate of natural gas substitution in order to lower fuel costs and on-site emissions, as well as to mitigate refueling issues with less on-site diesel fuel usage.

Figure 4:
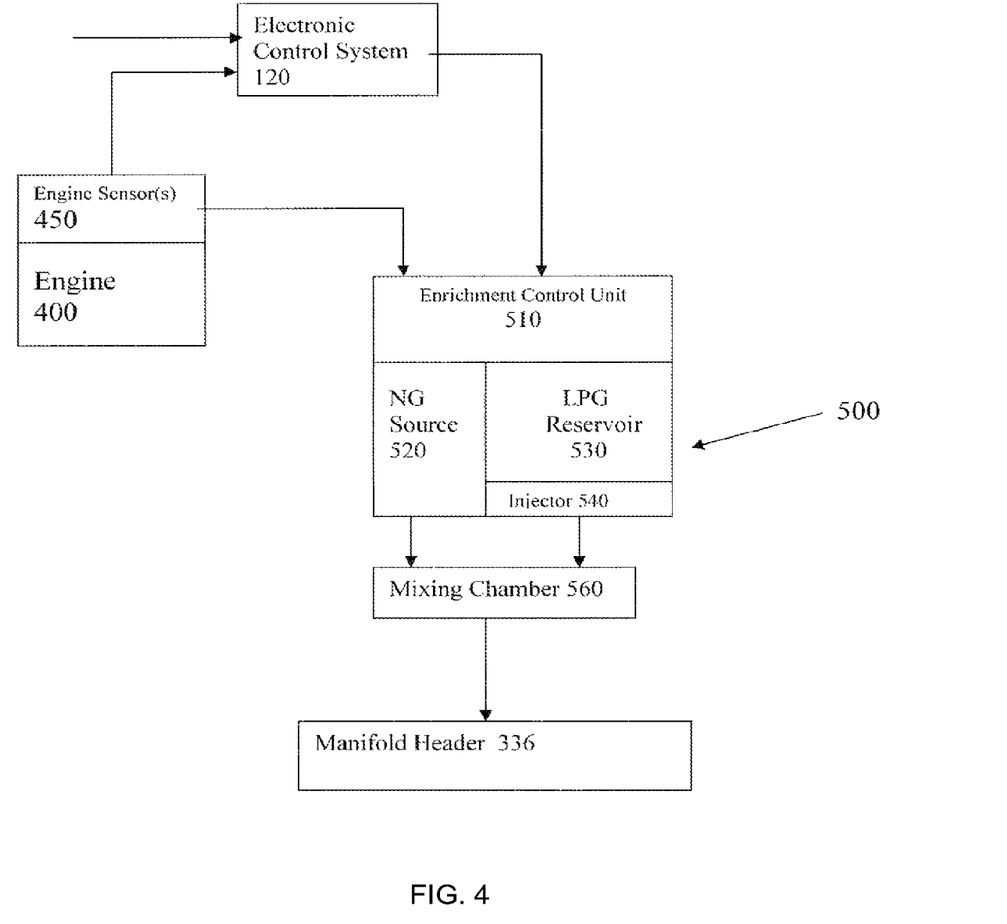
FIG. 4 is a schematic of an enrichment unit according to one embodiment of the invention.

Now referring to FIGS. 1-3B, in order to maximize the substitution of natural gas for diesel in the on-site dual fuel engines 400, the electronic control system 120 (shown in FIG. 2A) can calculate a desired BTU/cf for delivery to the downstream components of the natural gas supply system 10, such as the field distribution system 300, the gas enrichment unit 500 and the dual fuel engines 400. As illustrated in FIG. 4, each dual fuel engine will be monitored by an engine sensor mechanism 450. The engine sensor mechanism 450 may include one or more sensors that can continually detect and transmit operating data of the dual fuel engine 400. Engine data includes information on fuel flow, power load, RPMs and cylinder temperatures. The electronic control system 120 will analyze the real time engine data provided by the engine sensor mechanism 450 with reference to each engine's performance data. An engine's performance data is typically provided by the engine manufacturer's test data provided for each dual fuel engine or is calculated by the electronic control system 120.

The electronic control system 120 can then calculate an optimum BTU/cf content for the natural gas entering a diesel natural gas fuel blending system (not shown) of the on-site dual fuel engines 400. Since the electronic control system 120 communicates with all of the dual fuel engines, it calculates the desired BTU/cf for each dual fuel engine 400, as well as a minimum desired BTU/cf for all of the dual fuel engines 400 connected to the natural gas supply system 10.

The electronic control system 120 can be configured to instruct the natural gas conditioning system 150 to process the source gas to a BTU/cf that is about 10-50 BTU/cf below the minimum desired BTU/cf for all of the dual fuel engines 400 connected to the natural gas supply system 10 before delivering the processed gas to the downstream components of the natural gas supply system 10, such as the field distribution system 300, the gas enrichment unit 500 and the dual fuel engines 400.

The Gas Enrichment Unit

Figure 5:
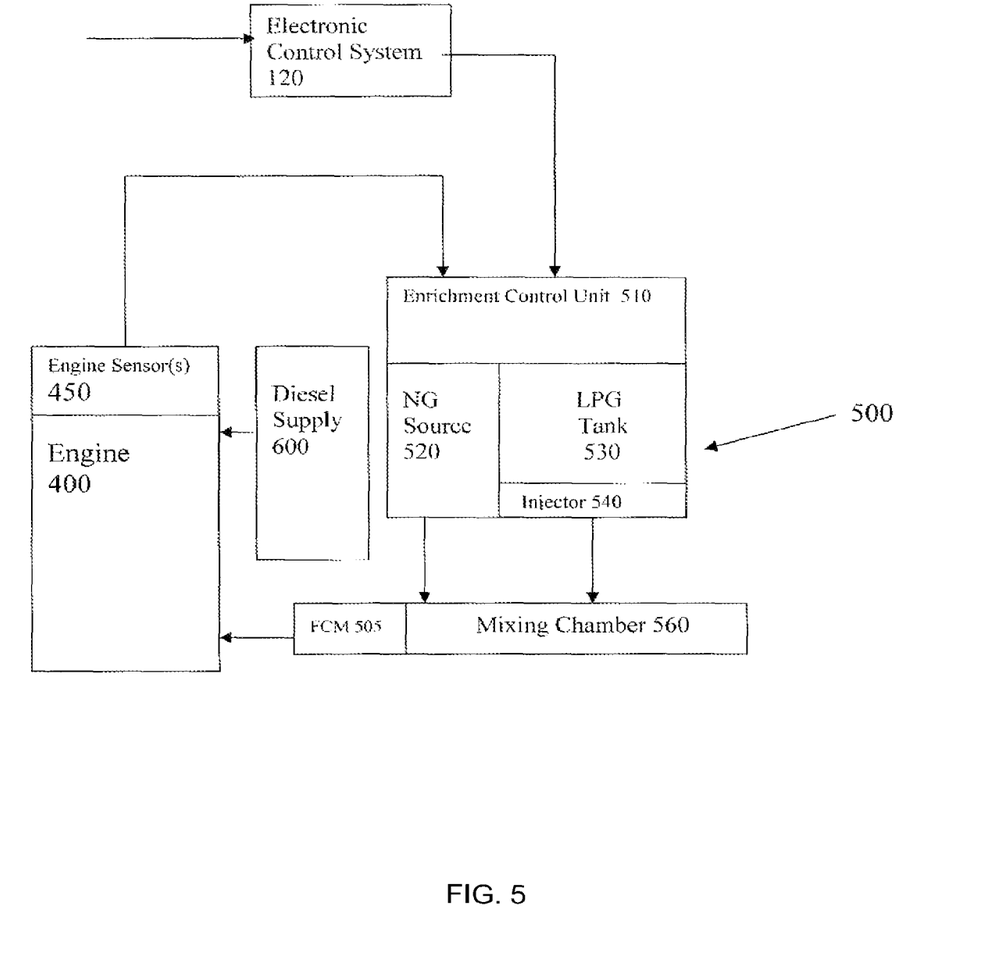
FIG. 5 is a schematic of an enrichment unit according to another embodiment of the invention.

A first embodiment of the gas enrichment unit 500, shown in FIG. 4, can be configured to be inserted into the manifold supply line 330, as shown in FIG. 3A. A second embodiment of the gas enrichment unit 500, shown in FIG. 5, is designed to be inserted into each engine supply line 350 that connects a manifold outlet 340 with a corresponding dual fuel engine, as shown in FIG. 3B.

Now referring to FIGS. 3A and 4, the gas enrichment unit 500 includes a conditioned natural gas source 520 supplied by the supply line 310, a liquefied petroleum gas (LPG) storage tank or reservoir 530, an enrichment control unit 510, an enrichment injector 540, and a mixing chamber 560. The enrichment control unit 510 is in constant communication with the electronic control system 120 (described with reference to FIGS. 2A and 2B) and optionally with the engine sensor mechanism 450 of the connected dual fuel engine 400. The enrichment injector 540 is supplied with a source of liquefied petroleum gas such as propane, butane, isobutane, pentane, or any combination of such gases. Commonly, the liquefied petroleum gas is stored on-site in a reservoir 530 such as a 5-20 gallon tank. The enrichment injector 540 may be an atomizer or a needle injector.

The characteristics of the conditioned natural gas such as the heat content or BTU/cf of the conditioned gas delivered from the natural gas processing unit 100 (as shown in FIG. 1) to the supply line 310 is constantly communicated to the enrichment control unit 510 by the electronic control system 120. In addition, the BTU/cf requirement of the connected dual fuel engine 400 is constantly communicated to the enrichment control unit 510 by the electronic control system 120 and/or calculated by the enrichment control unit 510 from the data acquired from the engine sensors 450. The electronic control system 120 dynamically provides the appropriate instructions to the gas enrichment unit 500 to adjust the caloric value of the natural gas source 520 to the desired BTU/cf needed for the efficient running of the dual fuel engine 400 under the specific operating conditions of the engine 400.

The natural gas source 520 used for multiple on-site dual fuel engines is preferably either Pipeline Gas (PG) having a BTU/cf of about 1000±50 BTUlcf or field gas having a reported range for North American field gas of about 950-1,650 BTU/cf with an average reported value of about 1025±25 BTU/cf. If the natural gas source 520 is PG or field gas, the BTU/cf for the natural gas source 520 delivered to the gas enrichment unit 500 is typically adjusted to be about 10-50 BTU/cf below the lowest calculated BTU/cf needed for the efficient running of the connected dual fuel engine 400. Field gas is typically processed through the natural gas processing unit 100.

Using the data obtained from the electronic control system 120, the enrichment control unit 510 dynamically determines the BTU/cf enrichment of the conditioned natural gas that is needed to optimize the efficiency and combustion of the connected dual fuel engines 400. The enrichment control unit 510 then instructs the enrichment injector 540 to inject a calculated quantity of a liquefied petroleum gas, having a known heat content that is higher than the heat content of the conditioned natural gas, into a mixing chamber 560 containing an appropriate quantity of the conditioned natural gas from the natural gas source 520 before it is delivered to the dual fuel engine 400. In some embodiments, the mixing chamber may be the manifold supply line 325. The enriched gas is then sent through the manifold header 336 and into the manifold outlets 340 having connected operating dual fuel engine 400.

An optional flow control meter (FCM) 505 can be positioned in each engine supply line 350 to ensure that the optimum quantity of enriched natural gas is delivered to the attached engine 400 at the desired timing and at the desired flow and pressure.

Now referring to FIGS. 3B and 5, the second embodiment of the gas enrichment unit 500 includes a natural gas source 520, a liquefied petroleum gas (LPG) storage tank or reservoir 530, an enrichment control unit 510, an enrichment injector 540, a mixing chamber 560, and a flow control meter 505.

The natural gas source 520 available for one or more of the on-site dual fuel engines 400 may be from a variety of sources such as Liquefied Natural Gas (LNG), Compressed Natural Gas (CNG), or even Pipeline Gas (PG). The BTU/cf of LNG and CNG is typically 1000±50 BTU/cf, whereas the reported range for North American field gas is 950-1,650 BTU/cf with an average reported value of about 1025±25 BTU/cf.

The most common source of natural gas used for trucks for a single generator is LNG or CNG with a BTU/cf of 1000±50, which is often less than the desired BTU/cf calculated for the optimum performance of the dual fuel engine 400. The natural gas source 520 preferably used for multiple dual fuel engines 400 used at a field site is from Pipeline Gas (PG) or field gas. If the natural gas source 520 is PG, the BTU/cf for the natural gas delivered to the enrichment unit 500 is typically adjusted to be about 10-50 BTU/cf below the lowest calculated BTU/cf needed for the efficient running of the connected dual fuel engine(s) 400. Field gas is typically processed through the processing unit 100 to be about 10-50 BTU/cf below the lowest calculated BTU/cf needed for the efficient running of the connected dual fuel engine 400.

The characteristics of the natural gas, such as, the heat content or BTU/cf of the conditioned gas delivered from the natural gas processing unit 100 (shown in FIG. 1) to the supply line 310 is constantly communicated to the enrichment control unit 510 by the electronic control system 120 (as shown in FIG. 2A or 2B), or if the natural gas source is CNG or LNG, the BTU/cf is entered into the enrichment control unit 510.

In this embodiment, the enrichment control unit 510 is also in constant communication with the engine sensor mechanism 450 of the connected dual fuel engines 400 and calculates the real time optimum BTU/cf requirement of the engine 400 under its current operating conditions. Using this real time data, the enrichment control unit 510 dynamically determines the BTU/cf enrichment of the natural gas source that is needed to optimize the efficiency and combustion of the connected dual fuel engine 400 under its current operating conditions.

The enrichment control unit 510 then instructs the enrichment injector 540 to inject a calculated quantity of a liquefied petroleum gas, from the LPG tank 530, having a known heat content that is higher than the heat content of the natural gas, into mixing chamber 560 filled with the natural gas to create an enriched natural gas having the optimum calculated BTU/cf for delivery to the connected dual fuel engine 400. The enrichment control unit 510 also communicates with an electronic flow control meter 505 to ensure that the desired quantity of the enriched natural gas in the mixing chamber 560 is delivered to the engine 400 at an optimum flow rate and pressure and at the appropriate timing.

Whenever the enriched natural gas delivered to the dual fuel engine 400 has the optimal heat content for that particular engine 400 under its specific operating conditions, the enriched natural gas can be substituted for up to 70% of the diesel fuel. In addition, if the enriched natural gas-diesel mixture is optimal for the efficient running of that specific dual fuel engine 400 and operating conditions, then the fuel combustion of the engine 400 will be almost complete thereby minimizing the non-combusted gas emitted from the engine 400.

In one example, an engine running at an engine load of 25% (idling) when burning LNG with a BTU/cf content of 950-1050 BTU/cf had between 8-12% of the natural gas exhausted from the engine as non-combusted methane. In contrast, an engine of the same engine type and load condition burning a 1250 BTU/cf enriched natural gas only had between 2%-3% of the natural gas exhausted from the engine as non-combusted methane.

In another example, an engine set at an engine load of 40-45% (typical of loads required of a field generator) fed an unenriched source of natural gas with a BTU/cf of 1050 produced an exhaust with about 21% non-combusted methane when the engine was run at a 30-40% NG substitution rate. On the other hand, a similar engine set at a similar engine load of 40-45% was fed an enriched source of natural gas with a calculated BTU/cf value for optimal efficiency (about 1120 BTU/cf) only produced an exhaust with about 3-4% non-combusted methane when the engine is run at a 30-40% natural gas substitution rate.

The Process

Figure 6:
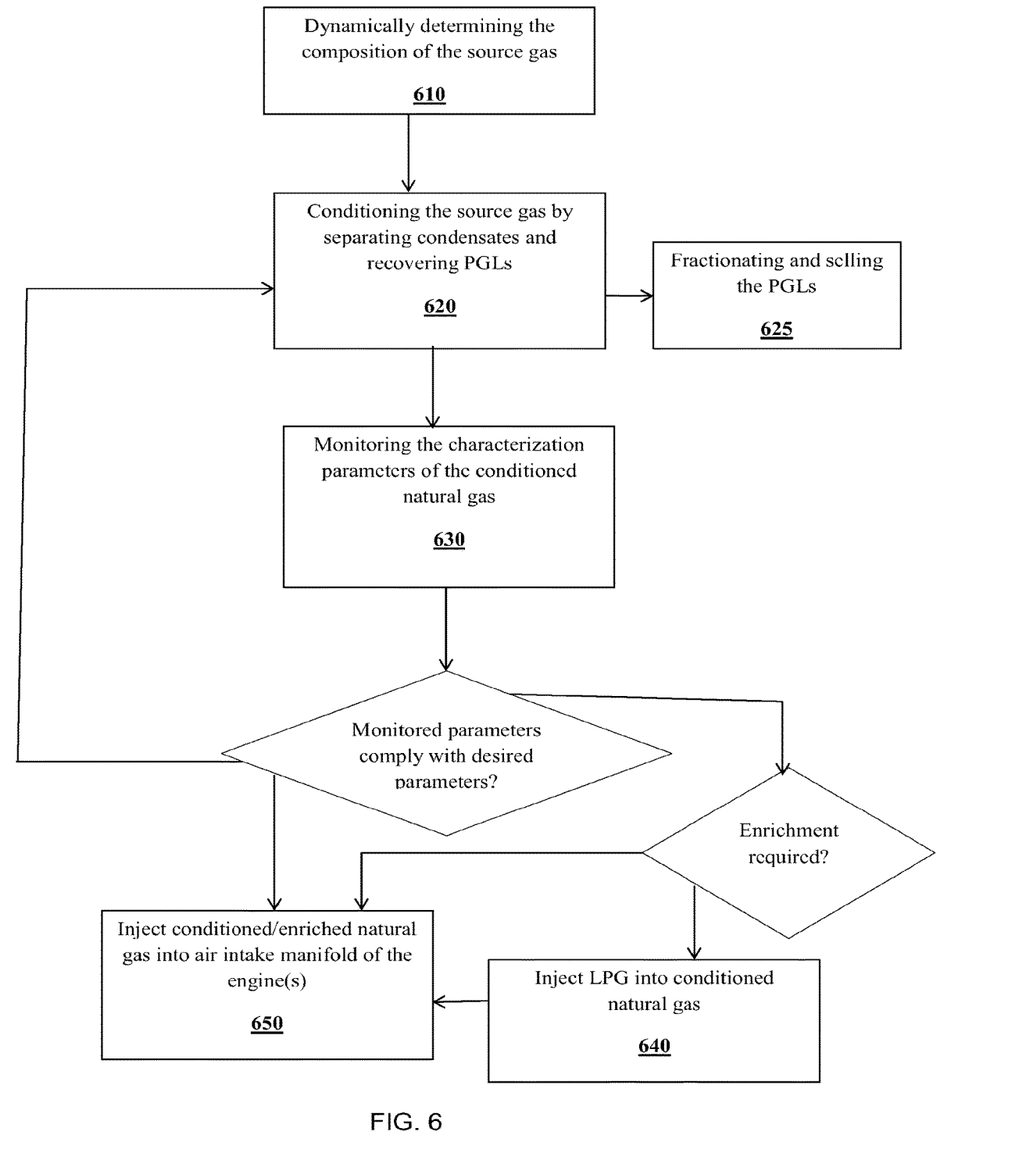
FIG. 6 is a flow diagram of a process for providing treated natural gas to dual fuel engines according to an embodiment of the invention.

According to another embodiment, a process for providing conditioned natural gas to an engine is disclosed. The engine may be a dual fuel engine as described earlier. The process involves providing an embodiment of the previously disclosed natural gas supply system. Referring to FIG. 6, the process involves dynamically determining the composition of the source gas 610 such as field gas or pipeline gas. According to one aspect, the composition of the source gas may be predetermined. The source gas can be conditioned 620 by the natural gas system. Conditioning the natural gas may involve the separation of condensates and recovering petroleum gas liquids (PGLs). The PGLs may be fractionated and sold 625. The gas characterization parameters of the conditioned natural gas may be continuously monitored 630.

An electronic control system acts as a central processing engine to implement this step by at least partially interfacing with engine sensor(s) and other sensors distributed throughout the natural gas supply system. If the parameters do not comply with a desired set of parameters, the previously conditioned gas is subjected to further conditioning 620. On the other hand, if the conditioned gas meets the desired set of parameters, it may be further analyzed to determine if it needs to be enriched with LPG. If enrichment is required, a predetermined quantity of LPG is introduced into the conditioned natural gas 640. The enriched natural gas (or conditioned natural gas without enrichment) may be delivered to one or more dual fuel engines 650.

Figure 7:
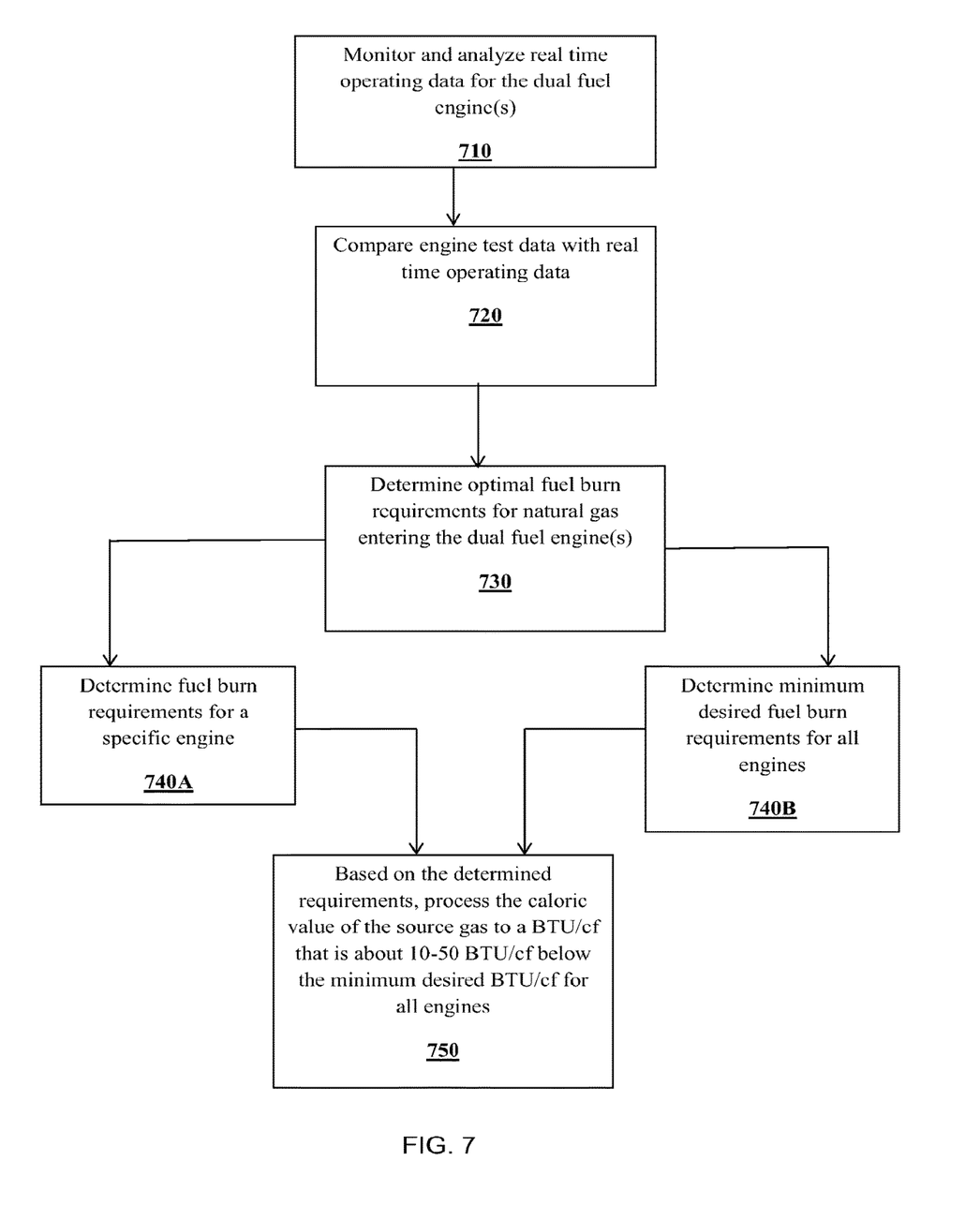
FIG. 7 is a flow diagram of a process for adjusting the caloric value of source natural gas according to an embodiment of the invention.

FIG. 7 illustrates an embodiment for optimizing the BTU/cf of the source gas supplied to one or more dual fuel engines. The method involves using an embodiment of the previously disclosed natural gas supply system. The method further involves utilizing the electronic control system of the natural gas supply system to monitor and analyze real time operating data 710 for the one or more engines. Test data, provided by the manufacturer of the engines, may be compared with the real time operating data 720 for the one or more engines. This comparison data can be used to determine the optimal fuel burn requirements for the natural gas entering the air inlet manifold of the one or more dual fuel engines 730. This determination may be made in substantially real time. Diesel engines are designed to burn 100% diesel, but it is cheaper and reduces the environmental footprint to substitute natural gas for a certain percentage of the diesel. Each engine has a different fuel burn requirement in order for the engine to sustain a set power or load (an older engine performs differently than a new engine). The method further involves determining the fuel burn requirement versus engine load for a specific engine 740A as well as a predetermined minimum desired fuel burn requirements for all (when the natural gas supply system includes more that one engine) the dual fuel engines connected to the natural gas supply system 740B. The electronic control system may instruct the natural gas conditioning system to process or condition the caloric value of the source gas to a BTU/cf that is about 10-50 BTU/cf below the minimum desired BTU/cf for all of the dual fuel engines connected to the natural gas supply system 750.

The control logic may selectively activate one or more components to affect injection of desired respective quantities of diesel and conditioned natural gas at desired respective timings in a piston cycle of the combustion chambers of the dual fuel engines. In certain embodiments, at each load level experienced by the engine, the engine is fed 100% diesel. The engine can then be fed the conditioned natural gas. At each load level of the engine, there is an optimum substitution of the conditioned natural gas of a calculated BTU value that is needed to maintain the desired power level of the engine and minimize the non-combusted methane. The conditioned natural gas substitution may be made in increments of about 10% to 20%. For example, the substitution rate may be made at 10%, 20%, 30%, etc. The engine load, combustion efficiency and non-combusted methane may be calculated in nearly real-time along with an optimum caloric content of the natural gas (i.e., the optimal natural gas BTU).

Figure 8:
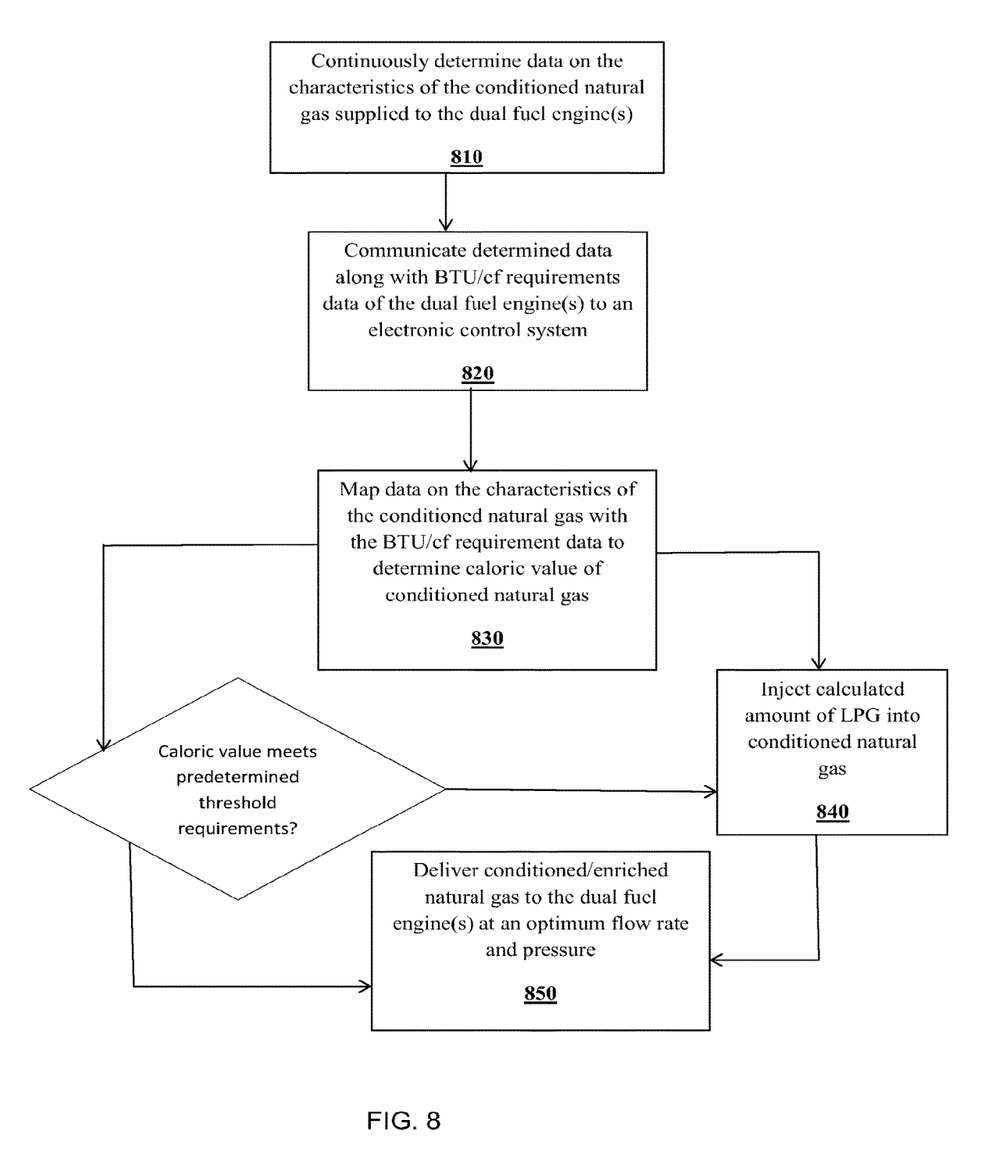
FIG. 8 is a flow diagram of a process for enriching conditioned natural gas according to an embodiment of the invention.

Referring to FIG. 8, a process for enriching the conditioned natural gas is illustrated according to an embodiment of the invention. The electronic control system of an embodiment of the previously described natural gas supply system may be in operative communication with a gas enrichment unit. The gas enrichment unit may be provided upstream of one or more dual fuel engines. The gas enrichment unit may also be connected to a flow pump, a liquefied petroleum gas (LPG) storage tank of high BTU petroleum gas and an enrichment injection pump. The enrichment injection pump can be configured to mix liquefied gas from the LPG storage tank into a conditioned natural gas fuel supply line.

The process may involve continuously determining data on the characteristics (such as, BTU content) of the conditioned natural gas that is to be supplied to the dual fuel engine 810. This data along with BTU/cf requirement data of the dual fuel engines may be constantly communicated to the enrichment control unit 820 by the electronic control system. In some aspects, the enrichment control unit may calculate the BTU/cf of the dual fuel engines. The process further involves mapping the data on the characteristics of the conditioned natural gas with the BTU/cf requirement data to determine a desired caloric value of the conditioned natural gas 830. If the caloric value does not meet previously determined minimum threshold values, the electronic control system may dynamically provide appropriate instructions to the gas enrichment unit to adjust the caloric value of the conditioned natural gas to the desired BTU/cf needed for optimizing the efficiency and combustion of the dual fuel engine(s) under the specific operating conditions of the engine(s) by injecting, into the conditioned natural gas, a calculated quantity of a liquefied petroleum gas having a known heat content that is higher than the heat content of the conditioned natural gas 840. In an example, the electronic control system includes control logic that can be configured to dynamically control BTU content of natural gas by opening a valve to a LPG storage tank and activating an enrichment injection pump such that the natural gas is enriched with a predetermined quantity of LPG. After the natural gas is enriched, the valve to the LPG storage tank may be closed. The enriched natural gas may be delivered at an appropriate time to the dual fuel engines at an optimum flow rate and pressure 850.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transitory computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing provides a detailed description of the invention which forms the subject of the claims of the invention. It should be appreciated by those skilled in the art that the general design and the specific embodiments disclosed might be readily utilized as a basis for modifying or redesigning the natural gas supply system to perform equivalent functions, but those skilled in the art should realized that such equivalent constructions do not depart from the spirit and scope of the invention as set forth in the appended claims.

What is claimed is:

1. A natural gas supply system comprising:
   (A) a natural gas processing unit having:
      (i) a natural gas conditioning system including a condensate separator and a natural gas liquids separator;
      (ii) a first gas characterization component in operative communication with the natural gas conditioning system; and
      (iii) an electronic control system in operative communication with the natural gas conditioning system and the first gas characterization component;
   (B) a first plurality of dual fuel engines receiving conditioned natural gas from the natural gas processing unit through a first discharge manifold connected to a first manifold supply line, wherein each dual fuel engine has an engine sensor mechanism in operative communication with that dual fuel engine and the electronic control system of the natural gas processing unit; and
   (C) a first gas enrichment unit in the first manifold supply line, the gas enrichment unit comprising:
      (i) an enrichment control unit in communication with the engine sensor mechanisms of the first plurality of dual fuel engines;
      (ii) an enrichment injector coupled to the enrichment control unit; and
      (iii) a source of liquefied petroleum gas in fluid communication with the enrichment injector, wherein the enrichment injector is disposed to inject liquefied petroleum gas into the first manifold supply line.

2. The natural gas supply system according to claim 1, further comprising a source of natural gas connected to the natural gas conditioning system.

3. The natural gas supply system according to claim 1, wherein the first gas characterization component is located downstream of the natural gas conditioning system.

4. The natural gas supply system according to claim 3, further comprising a second gas characterization component located upstream of the natural gas conditioning system.

5. The natural gas supply system according to claim 4, wherein the second gas characterization component is configured to determine one or more characteristic parameters of a pre-conditioned source natural gas.

6. The natural gas supply system according to claim 1, wherein the first gas characterization component is configured to determine one or more characteristic parameters of the conditioned natural gas.

7. The natural gas supply system according to claim 1, wherein the first gas characterization component is configured to communicate changes to a value associated with the one or more characteristic parameters of the conditioned natural gas to the natural gas conditioning system.

8. The natural gas supply system according to claim 1, further comprising:
   an emergency shutdown valve in close proximity to an outlet of the natural gas processing unit.

9. The natural gas supply system according to claim 1, further comprising:
   a gas supply line having a proximal end and a distal end, wherein the proximal end is connected to the natural gas processing unit and the distal end is connected to the manifold supply line.

10. The natural gas supply system according to claim 9, wherein the discharge manifold has a plurality of manifold header outlets.

11. The natural gas supply system according to claim 9, wherein at least one or more of the manifold header outlets is connected to a corresponding engine supply line.

12. The natural gas supply system according to claim 11, further comprising a reel of hose, wherein one end of the hose is connected to the gas supply line and a second end of the hose forms the manifold supply line connected to the manifold header.

13. The natural gas supply system according to claim 12, wherein an internal diameter of the hose and the manifold header are substantially larger than an internal diameter of the manifold header outlets and the engine supply lines.

14. The natural gas supply system according to claim 9, further comprising a purge line coupled to the gas supply line.

15. The natural gas supply system according to claim 9, wherein the gas supply line has substantially a same diameter as the manifold supply line.

16. The natural gas supply system according to claim 9, further comprising a second plurality of dual fuel engines receiving conditioned natural gas from the natural gas processing unit through a second discharge manifold connected to a second manifold supply line, wherein the second manifold supply line is attached to an outlet end of the discharge manifold.

17. The natural supply system according to claim 16, further comprising:
   a second plurality of dual fuel engines receiving conditioned natural gas from the natural gas processing unit through a second discharge manifold connected to a second manifold supply line, wherein the first manifold supply line is positioned parallel to the second manifold supply line; and
   a second gas enrichment unit in the second manifold supply line, the second gas enrichment unit comprising:
      (i) a second enrichment control unit in communication with the engine sensor mechanisms of the second plurality of dual fuel engines;
      (ii) a second enrichment injector coupled to the second enrichment control unit, wherein the second enrichment injector is in fluid communication with the source of liquefied petroleum gas, and wherein the second enrichment injector is disposed to inject liquefied petroleum gas into the second manifold supply line.

18. The natural supply system according to claim 1, wherein the electronic control system is configured to determine a desired BTU/cf for each dual fuel engine, as well as a minimum desired BTU/cf for all of the dual fuel engines.

19. The natural supply system according to claim 18, wherein the electronic control system is configured to instruct the natural gas conditioning system to process a source gas to a BTU/cf that is about 10-50 BTU/cf below the minimum desired BTU/cf for all of the dual fuel engines before delivering the processed gas to the dual fuel engines.

20. The natural gas supply system according to claim 1, wherein the first gas enrichment unit further comprises an electronic flow control device.

21. The natural gas supply system according to claim 20, wherein the flow control device comprises a flow meter.

22. The natural gas supply system according to claim 1, wherein the enrichment injector comprises an atomizer or a needle injector.

23. The natural gas supply system according to claim 1, wherein the liquefied petroleum gas is propane, butane, isobutane, pentane or a mixture of the same.

24. A process for providing conditioned natural gas comprising:
    providing a natural gas system comprising:
    (A) a natural gas processing unit having:
        (i) a natural gas conditioning system including a condensate separator and a natural gas liquids separator;
        (ii) a first gas characterization component in operative communication with the natural gas conditioning system; and
        (iii) an electronic control system in operative communication with the natural gas conditioning system and the first gas characterization component;
    (B) a plurality of dual fuel engines receiving conditioned natural gas from the natural gas processing unit through a discharge manifold connected to a manifold supply line, wherein each dual fuel engine has an engine sensor mechanism in operative communication with that dual fuel engine and the electronic control system of the natural gas processing unit; and
    (C) a gas enrichment unit in the manifold supply line, the gas enrichment unit comprising:
        (i) an enrichment control unit in communication with the engine sensor mechanism of the connected dual fuel engine;
        (ii) an enrichment injector coupled to the enrichment control unit; and
        (iii) a source of liquefied petroleum gas in fluid communication with the enrichment injector, wherein the enrichment injector is disposed to inject liquefied petroleum gas into the manifold supply line;
    dynamically determining one or more characteristic parameters of a source natural gas;
    treating the source natural gas by removing condensates and recovering petroleum gas liquids; and
    enriching the treated natural gas by injecting it with a calculated amount of the liquid petroleum gas.

25. The process according to claim 24, further comprising analyzing one or more characteristic parameters of the treated natural gas, wherein the LPG is injected upon the condition that a value associated with the one or more characteristic parameters of the treated natural gas is less than a predetermined threshold value.

26. The process according to claim 25, further comprising providing the enriched natural gas to the dual fuel engines at an optimum flow rate and pressure.

27. The process according to claim 24, further comprising determining an optimal fuel burn requirement for the source natural gas by comparing test data for the dual fuel engines with real time operating data for the dual fuel engines.

* * * * *